United States Patent
Hamada et al.

(10) Patent No.: US 7,486,863 B2
(45) Date of Patent: Feb. 3, 2009

(54) METHOD FOR TREATING OPTICAL FIBER AND APPARATUS FOR TREATING OPTICAL FIBER

(75) Inventors: Takahiro Hamada, Sakura (JP); Munehisa Fujimaki, Sakura (JP); Kenji Yamashiro, Sakura (JP); Koichi Harada, Sakura (JP); Yukinari Shirako, Sakura (JP); Hiroyuki Sawano, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/455,690

(22) Filed: Jun. 20, 2006

(65) Prior Publication Data

US 2006/0233502 A1    Oct. 19, 2006

Related U.S. Application Data

(63) Continuation of application No. PCT/JP2004/001803, filed on Feb. 18, 2004.

(30) Foreign Application Priority Data

Dec. 22, 2003    (JP)    ............... 2003-424632

(51) Int. Cl.
*G02B 6/02*    (2006.01)
(52) U.S. Cl. .................. 385/123; 385/110; 385/115
(58) Field of Classification Search .......... 385/100, 385/115, 123
See application file for complete search history.

(56) References Cited

U.S. PATENT DOCUMENTS

| | | | |
|---|---|---|---|
| 6,499,318 | B1 | 12/2002 | Lemaire et al. |
| 2003/0010064 | A1 | 1/2003 | Kuwahara et al. |
| 2003/0084684 | A1 | 5/2003 | Zhang |
| 2004/0139766 | A1 | 7/2004 | Weeks et al. |
| 2005/0011230 | A1* | 1/2005 | Shirley et al. .................. 65/385 |

FOREIGN PATENT DOCUMENTS

| | | |
|---|---|---|
| EP | 1 182 176 | 2/2002 |
| JP | 63-151642 | 6/1988 |
| JP | 4-59970 | 5/1992 |
| JP | 2002-148450 | 5/2002 |
| JP | 2003-137580 | 5/2003 |
| JP | 2003-255143 | 9/2003 |
| JP | 2003-261351 | 9/2003 |
| JP | 2004-226979 A | 8/2004 |
| RU | 2049487 C1 | 12/1995 |
| SU | 1744672 A1 | 6/1992 |
| WO | WO 02/46114 A1 | 6/2002 |

* cited by examiner

*Primary Examiner*—Jennifer Doan
(74) *Attorney, Agent, or Firm*—Sughrue Mion, PLLC

(57) ABSTRACT

A method of treating optical fiber includes at least a first step of creating a reduced-pressure atmosphere in a space which holds the optical fiber, and a second step of introducing to the space a deuterium-containing gas so as to expose the optical fiber to the gas.

8 Claims, 2 Drawing Sheets

METHOD FOR TREATING OPTICAL FIBER AND APPARATUS FOR TREATING OPTICAL FIBER

TECHNICAL FIELD

This application is a Continuation Application, under 35 U.S.C. § 111 (a) and 37 C.F.R. § 1.53 of and claims priority from International Application No. PCT/JP2004/001803 filed Feb. 18, 2004 and Japanese Patent Application No. 2003-424632 filed on Dec. 22, 2003, the contents of which are incorporated herein by reference.

The present invention relates to a method and an apparatus for treating optical fibers.

BACKGROUND ART

Optical fiber is generally produced by melting and drawing a fiber from a quartz glass (glass perform). Specifically, the glass preform is melted at a high temperature of about 2000° C., and glass that has melted from the tip thereof is drawn into a fiber. The drawn glass is then rapidly cooled in a cooling duct or the like, and then the surface of the fiber is coated with a protective resin, thereby completing production.

In this optical fiber production process, when the molten and drawn glass is rapidly cooled, non-bridging oxygen hole centers (NBOHC) are known to form. By slowing the cooling speed of the molten and drawn glass, the recombination of the NBOHCs is promoted. The number of such defects can be reduced. However, in the optical fiber production process, it is difficult to completely eliminate NBOHCs from an optical fiber.

The NBOHCs that remain in the optical fiber combine with hydrogen that evolves from the protective resin on the surface of the optical fiber or from the cable armor and the environment in which the optical fiber cable has been laid, becoming Si—OH. When such hydroxyl groups (—OH) form, optical loss at a wavelength of 1.38 μm increases, compromising the optical fiber propagation characteristics.

One approach for suppressing optical loss at 1.38 μm involves exposing the optical fiber to deuterium-containing gas so as to effect a reaction between NBOHCs in the glass with deuterium (D2) in order to form deuteroxyl groups (—OD) (see JP-A 2002-148450, JP-A 2003-137580).

NBOHCs can readily react with deuterium at room temperature to form deuteroxyl groups. Because the light absorption by these deuteroxyl groups occurs at a wavelength of 1.87 μm, the absorption wavelength band can be shifted outside of the 1.3 μm optical communication wavelength band.

In the foregoing method of reacting NBOHCs with deuterium (D2) to form deuteroxyl groups (—OD), in order to hold down production costs, it is desirable for treatment to be carried out over a short exposure time using a gas containing a low concentration of deuterium.

For example, JP-A 2002-148450 discloses that an exposure time of one week is required to expose optical fiber to deuterium-containing gas. The optical fiber is generally exposed to the deuterium-containing gas in a bobbin-wound state. However, the deuterium-containing gas has difficulty reaching the area close to the core of the bobbin. Since NBOHCs in the optical fiber readily combine with deuterium to form deuteroxyl groups, the reaction for rendering NBOHCs into deuteroxyl groups is strongly dependent on the amount of deuterium molecules that penetrate to the optical fiber.

For such reasons, of the optical fiber that has been wound onto a bobbin, penetration of the deuterium molecules into the optical fiber located near the bobbin core, i.e., in the bottom layers of the optical fiber, takes time, making it difficult for the reaction between the NBOHCs and deuterium to proceed. For example, even when an optical fiber that has been wound onto a bobbin or the like is exposed for 24 hours to a mixed gas containing deuterium gas in a concentration of 1% in accordance with the method disclosed in the foregoing reference, depending on the amount of optical fiber wound onto the bobbin, the NBOHCs are not eliminated in the optical fiber located near the core of the bobbin, i.e., in the bottom layers. Therefore, eliminating NBOHCs throughout the optical fiber has required a high-concentration deuterium-containing gas and a long exposure time.

The exposure of optical fiber to a deuterium-containing gas atmosphere is carried out by placing the optical fiber in a reactor, feeding deuterium-containing gas into the reactor, and then sealing the reactor to maintain the exposure for a given period of time in this state.

Following exposure of the optical fiber for a given period of time to the deuterium-containing gas atmosphere, it has been the practice until now to discharge the deuterium-containing gas without re-using it. However, due to the high cost of deuterium-containing gas, this practice increases the production cost of the optical fiber.

DISCLOSURE OF THE INVENTION

It is therefore an object of the present invention to provide a method of treating optical fiber which is capable of eliminating non-bridging oxygen hole centers in the optical fiber within a short exposure time using a low-concentration deuterium-containing gas. Another object of the present invention is to provide an apparatus for treating optical fiber, which apparatus is capable of reusing the deuterium-containing gas and can carry out treatment of optical fiber with deuterium-containing gas at a low cost.

In a first aspect, the present invention provides a method of treating optical fiber, comprising at least a first step of creating a reduced-pressure atmosphere in a space which holds an optical fiber, and a second step of introducing to the space a deuterium-containing gas so as to expose the optical fiber to the gas.

In a second aspect, the present invention provides a method of treating optical fiber, wherein a deuterium-containing gas is repeatedly used for treating optical fiber by repeating following steps a plurality of times:
  a first step of creating a reduced-pressure atmosphere in a space which holds an optical fiber, a second step of introducing to the space a deuterium-containing gas from a deuterium storage tank so as to expose the optical fiber to the gas, and
  a third step of retrieving the deuterium-containing gas within the space to the deuterium storage tank.

In a third aspect, the present invention provides an apparatus for treating optical fiber, comprising a first space for exposing an optical fiber to a deuterium-containing gas, a second space for storing the deuterium-containing gas, and a third space for connecting the first space and the second space; wherein the apparatus has, in the third space, element for supplying gas.

BRIEF DESCRIPTION OF THE DIAGRAMS

BEST MODE FOR CARRYING OUT THE INVENTION

Figure 1:
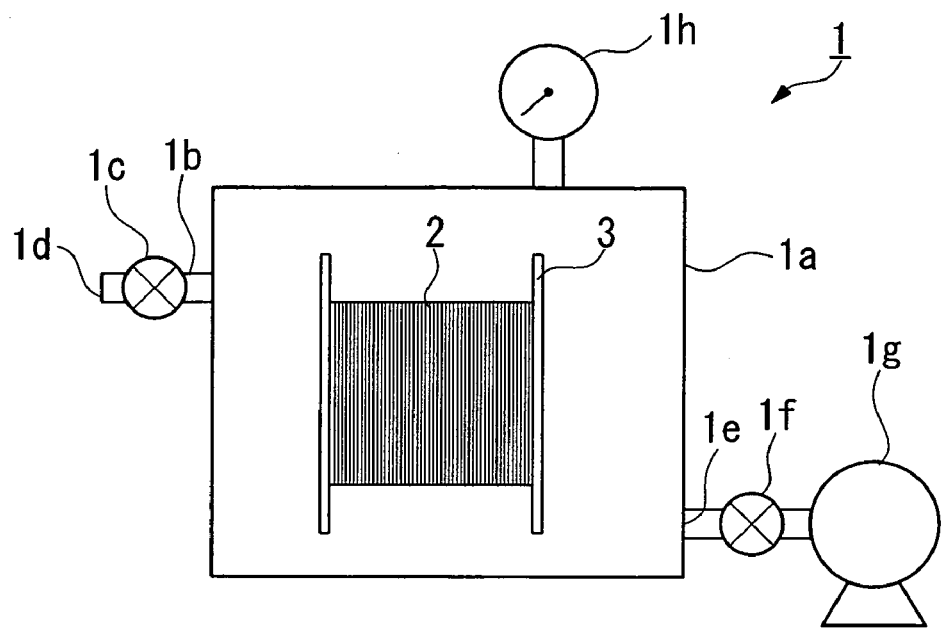
FIG. 1 is a schematic view of an optical fiber treating apparatus.

The method of treating optical fiber according to the present invention is characterized by including at least a first step of creating a reduced-pressure atmosphere in a space which holds an optical fiber, and a second step of introducing to the space a deuterium-containing gas so as to expose the optical fiber to the gas.

These features of the present invention can increase the rate of diffusion of deuterium-containing gases within the reactor. As a result, even when the optical fiber has been wound onto a bobbin, the deuterium-containing gas passes through very small gaps between the wound-up optical fiber and rapidly reach the vicinity of the bobbin core.

In the above method of treating optical fiber, it is preferable for the reduced-pressure atmosphere within the space in the first step to be set to a pressure of at least 0.01 kPa but not more than 76 kPa. Doing so can spread the deuterium-containing gas throughout the optical fiber wound onto a bobbin or the like, which in turn allows a sufficient amount of deuterium molecules to penetrate in the optical fiber near the bobbin core, making it possible to promote the reaction between NBOHCs and deuterium molecules (the NBOHC annihilation reaction).

In the above optical fiber treating method, it is preferable for the optical fiber in the second step to be exposed to the deuterium-containing gas at a deuterium gas partial pressure of at least 0.1 kPa but not more than 5 kPa.

This can provide for a concentration of deuterium gas sufficient for annihilating NBOHCs to spread throughout the optical fiber wound onto the bobbin.

In the above optical fiber treating method, it is preferable for the optical fiber in the second step to be exposed to the deuterium-containing gas at a pressure within the space of at least 10.1 kPa but not more than 304 kPa.

This can provide for the deuterium-containing gas to spread rapidly to the vicinity of the bobbin core, which in turn allows a sufficient amount of deuterium molecules to penetrate in the optical fiber, making it possible to promote the NBOHC annihilation reaction.

In the above optical fiber treating method, it is preferable for the optical fiber in the second step to be exposed to the deuterium-containing gas for a period of not more than one day. This can provide for the production capacity per unit apparatus to rise and production costs to be lowered.

The method of treating an optical fiber according to the present invention preferably includes a first space for exposing the optical fiber to a deuterium-containing gas, a second space for storing the deuterium-containing gas, and a third space for connecting the first space and the second space; wherein the third space can be provided with a gas transfer element.

In this way, deuterium gas that has been used, rather than being released to the atmosphere, is collected in a deuterium storage tank and can be used again for deuterium treating other optical fibers.

The optical fiber treating method of the present invention, by creating a reduced-pressure atmosphere within a reactor in which an optical fiber has been placed and supplying a deuterium-containing gas to the reactor in this state, can provide for the deuterium-containing gas to pass through very small gaps in the wound optical fiber and spread throughout the optical fiber to the vicinity of the bobbin core, even when the optical fiber is wound onto a bobbin.

This method can provide for optical fiber wound onto a bobbin to be uniformly exposed to deuterium gas over its entire length. As a result, non-bridging oxygen hole centers can be annihilated in a short exposure time.

The optical fiber treating apparatus of the present invention can provide for the repeated use of deuterium-containing gas, making it possible to reduce running costs.

Embodiments of the present invention are described more fully below in conjunction with the attached views.

Optical Fiber Treatment Method

FIG. 1 is a schematic view showing an example of an apparatus for treating optical fiber. The optical fiber treating apparatus 1 includes at least a reactor 1a. This reactor 1a is a sealable vessel which can hold in its interior an optical fiber 2. It has a pressure resistance and sealability capable of withstanding a vacuum state of about 0.1 kPa and pressurized states ranging from atmospheric pressure to 304 kPa.

The reactor 1a has a gas inlet 1b which is connected to a gas feed line 1d through a gas intake on-off valve 1c in such a way that deuterium-containing gas can be fed from the gas feed line 1d into the reactor 1a.

As used herein, "deuterium-containing gas" refers to deuterium gas alone or a mixed gas containing deuterium gas.

The reactor 1a also has an outlet 1e which is connected to a vacuum pump 1g through a gas discharge on-off valve 1f in such a way that air within the reactor 1a can be discharged by the vacuum pump 1g.

In place of the gas intake on-off valve 1c, the reactor 1a may instead be provided with a device such as flow meter or the like that is capable of adjusting the gas flow rate. Any device capable of adjusting the flow rate of deuterium-containing gas fed into the reactor 1a can be used in the present invention.

The reactor also has a differential pressure gauge 1h to provide for the measurement of the pressure within the reactor 1a. The feed rate of the deuterium-containing gas can be adjusted based on the measured value to form a deuterium-containing gas atmosphere of a predetermined pressure within the reactor 1a, or the vacuum pump 1g can be started up or shut down based on the measured value to form a reduced-pressure atmosphere of a predetermined pressure within the reactor 1a.

The reactor 1a can have a temperature regulating element such as a heater or a cooling mechanism, as well as a thermometer and a temperature regulator, providing for the internal temperature to be adjusted so as to set the interior of the reactor 1a to a constant temperature state of 50° C. or below.

In a first step, an optical fiber 2 is exposed to a reduced-pressure atmosphere in the following manner. First, an optical fiber 2 wound onto a bobbin 3 is placed at rest in the reactor 1a of the treatment apparatus 1.

Any optical fiber made of a suitable material such as quartz glass may be used without limitation as the optical fiber 2.

The vacuum pump 1g is operated, and then, the gas discharge on-off valve 1f is opened and air within the reactor 1a is discharged, thereby creating a reduced-pressure atmosphere within the reactor 1a (i.e., in the space which holds the optical fiber 2) and exposing the optical fiber to the reduced-pressure atmosphere.

Next, in a second step subsequent to the above first step, the optical fiber 2 is exposed to a deuterium-containing gas atmosphere in the following manner. After the gas discharge on-off valve 1f is closed, the temperature within the reactor 1a is adjusted to 50° C. or below.

The gas intake on-off valve 1c is then opened and deuterium-containing gas is fed to the interior of the reactor 1a under a reduced-pressure atmosphere. After the deuterium-containing gas is fed until the interior of the reactor 1a reaches a predetermined pressure, the gas intake on-off valve 1c is closed to seal the interior of the reactor 1a and the optical fiber 2 is exposed to the deuterium-containing gas atmosphere.

The optical fiber 2 is exposed in this way to deuterium-containing gas, inducing non-bridging oxygen hole centers (NBOHC) in the glass to react with deuterium (D2) so as to form deuteroxyl groups (—OD) and prevent the formation of hydroxyl groups (—OH). The absorption wavelength band is thus shifted outside of the 1.3 μm optical communication wavelength band, making it possible to suppress the influence of light absorption by hydroxyl groups in the glass on the transmission characteristics of the optical fiber 2.

By forming a reduced-pressure atmosphere within a reactor 1a in which optical fiber 2 has been placed and feeding a deuterium-containing gas into the reactor 1a in this state, although the optical fiber has been wound onto the bobbin 3, the deuterium-containing gas passes through very small gaps in the wound optical fiber 2, rapidly reaching even the vicinity of the core within the bobbin 3. This can provide for a sufficient amount of deuterium molecules to be penetrated in the optical fiber near the core of the bobbin 3, making it possible to promote the NBOHC annihilation reaction.

NBOHCs readily combine with deuterium to form deuteroxyl groups. Hence, the reaction in which NBOHC combine with deuterium to form deuteroxyl groups (NBOHC annihilating reaction) is strongly influenced by the amount of deuterium molecules that penetrate in the optical fibers.

In the practice of the present invention, a sufficient amount of deuterium molecules can be penetrated in the optical fiber even near the core of the bobbin 3, such that the NBOHC annihilation reaction can be promoted. Hence, the NBOHC annihilation reaction can be promoted over the entire length of the optical fiber 2 wound onto the bobbin 3, making it possible to eliminate NBOHCs throughout the optical fiber even with a short period of exposure to a low-concentration deuterium-containing gas.

Next, the present invention is described more fully based on experimental results.

Figure 2:
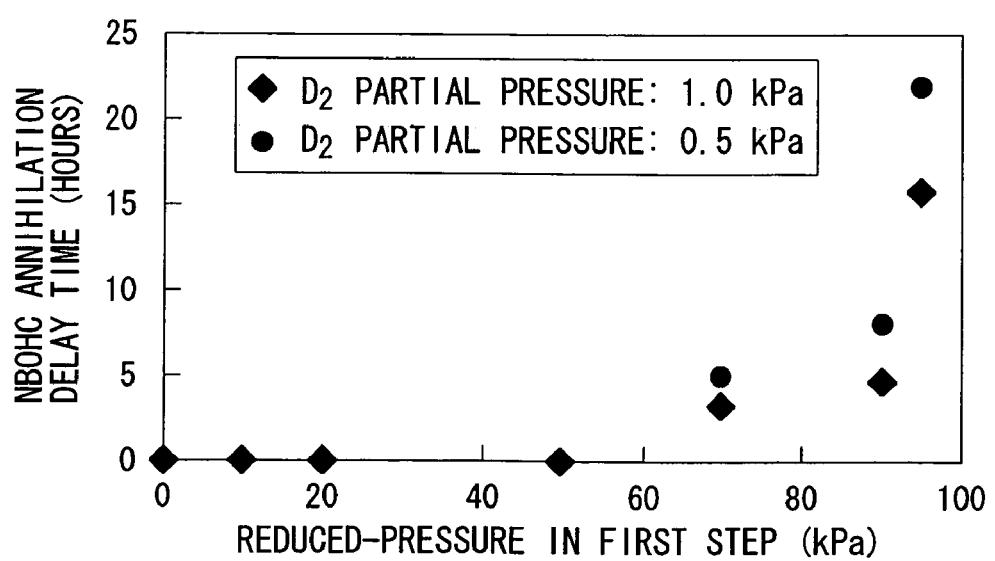
FIG. 2 is a chart showing the relationship between the non-bridging oxygen hole center annihilation delay time and the pressure of the reduced-pressure atmosphere in the first step.

FIG. 2 is a chart showing the relationship between the NBOHC annihilation delay time in an optical fiber 2 wound onto a bobbin 3 and the pressure of the reduced-pressure atmosphere in the first step.

"NBOHC annihilation delay time" refers herein to the difference, in optical fiber wound onto a bobbin 3, between the NBOHC annihilation time for optical fiber 2 in the bottommost layer and the NBOHC annihilation time for optical fiber 2 in the topmost layer; that is, the difference in the NBOHC annihilation time for optical fiber 2 in the bottommost layer versus the NBOHC annihilation time for the optical fiber 2 in the topmost layer.

Here, "optical fiber 2 situated in the bottommost layer" refers to the portion of the optical fiber 2 wound onto a bobbin 3 that is located directly on the core of the bobbin 3 (portion of optical fiber 2 provided on core). "Optical fiber 2 situated in topmost layer" refers to the portion of the optical fiber 2 wound onto the bobbin 3 that is located closest to the surface (topmost layer portion of optical fiber 2).

A shorter NBOHC annihilation delay time means a shorter NBOHC annihilation time for the optical fiber 2 located in the bottommost layer (rapid NBOHC annihilation reaction), and thus the value for the optical fiber 2 located in the bottommost layer closer to the NBOHC annihilation time for the optical fiber 2 located in the topmost layer. A shorter NBOHC annihilation delay time means that less time is required to annihilate NBOHCs over the entire length of the optical fiber 2 wound onto the bobbin 3.

"NBOHC annihilation time for the optical fiber 2" refers herein to results measured by the following method.

The amount of light absorption at the NBOHC absorption wavelength of 0.63 μm is measured for the optical fiber 2 that has been exposed to deuterium for a predetermined period of time, and the residual amount of NBOHCs is measured from this light absorption amount.

Next, the change over time in the residual amount of NBOHCs with respect to the exposure time of the optical fiber 2 to the deuterium-containing gas is determined by measurement at a plurality of times. The deuterium-containing gas exposure time required to completely annihilate NBOHCs was estimated based on the change over time in the residual amount of these NBOHCs, and treated as the NBOHC annihilation time.

The bullets in FIG. 2 indicate the results obtained by using in the second step a mixed gas atmosphere having a deuterium partial pressure of 0.5 kPa, and the diamonds indicate the results obtained by using in the second step a mixed gas atmosphere having a deuterium partial pressure of 1.0 kPa.

In the above first step, the reduced-pressure atmosphere has a pressure of preferably at least 0.01 kPa but not more than 76 kPa, more preferably at least 0.01 kPa but not more than 50.7 kPa, and even more preferably at least 0.01 kPa but not more than 5.1 kPa. This can provide for the deuterium-containing gas to spread throughout all of the optical fiber 2 wound onto a bobbin 3 or the like. As a result, a sufficient amount of deuterium molecules can be penetrated in the optical fiber 2 near the core of the bobbin 3, such that the reaction between NBOHCs and deuterium gas (NBOHC annihilation reaction) can be promoted.

The NBOHC annihilation time for optical fiber 2 situated in the bottommost layer can thus be shortened, substantially reducing the NBOHC annihilation delay time, as shown in FIG. 2.

NBOHCs can be annihilated throughout the optical fiber 2 using a low-concentration deuterium-containing gas in the second step, even over a short exposure time. In particular, when the pressure of the reduced-pressure atmosphere is at least 0.01 kPa but not more than 50.7 kPa, the NBOHC annihilation delay time is 0 hours, which means that, even in the optical fiber 2 located in the bottommost layer, NBOHCs and deuterium can be made to react so as to annihilate the NBOHCs at a reaction rate comparable with that for the optical fiber 2 located in the topmost layer.

Also, in the second step, it is preferable to expose the optical fiber to deuterium-containing gas having a deuterium partial pressure of at least 0.1 kPa but not more than 5.1 kPa. It is more preferable to expose the optical fiber to deuterium-containing gas having a deuterium partial pressure of at least 0.7 kPa but not more than 2.0 kPa. In this way, a sufficient amount of deuterium molecules to annihilate the NBOHCs can be penetrated throughout the entire length of the optical fiber wound onto the bobbin 3.

At a deuterium partial pressure of less than 0.1 kPa, the deuterium gas concentration is low, making it difficult to annihilate NBOHCs throughout the optical fiber 2. On the other hand, a deuterium partial pressure of more than 5 kPa is also undesirable, since very high deuterium partial pressure may induce an explosion.

In the second step, it is preferable to set the pressure within the reactor 1a when the deuterium-containing gas is fed to the reactor 1a holding the optical fiber 2 to at least 10.1 kPa but not more than 304 kPa, and to expose the optical fiber 2 to deuterium-containing gas within this pressure range.

At a deuterium-containing gas pressure of less than 10.1 kPa within the reactor 1a where the optical fiber 2 is exposed, penetration of the deuterium molecules into the optical fiber takes time, requiring a long time for the NBOHC annihilating reaction.

On the other hand, at a deuterium-containing gas pressure of more than 203 kPa within the reactor 1a where the optical fiber 2 is exposed, a reactor 1a having a high pressure resistance must be used, increasing the cost of manufacturing the reactor 1a.

Moreover, it is preferable for the optical fiber in the second step to be exposed to the deuterium-containing gas for an exposure time of one day or less. An exposure time of 12 hours or less is more preferred. This enhances the production capacity per unit apparatus, so that the production costs can be reduced.

It is also preferable for the optical fiber 2 in the second step to be exposed to the deuterium-containing gas at a temperature within the reactor 1a that is controlled to not more than 50° C. In this way, there is no need to impart the reactor 1a with a high heat-retaining ability, making it possible to lower the cost of manufacturing the reactor 1a. The temperature within the reactor 1a is more preferably set to at least 15° C., but not more than 50° C. At a temperature within the reactor 1a of more than 50° C., the resin layer coating on the surface of the optical fiber 2 may undergo deterioration by the heat.

Optical Fiber Treating Apparatus

Figure 3:
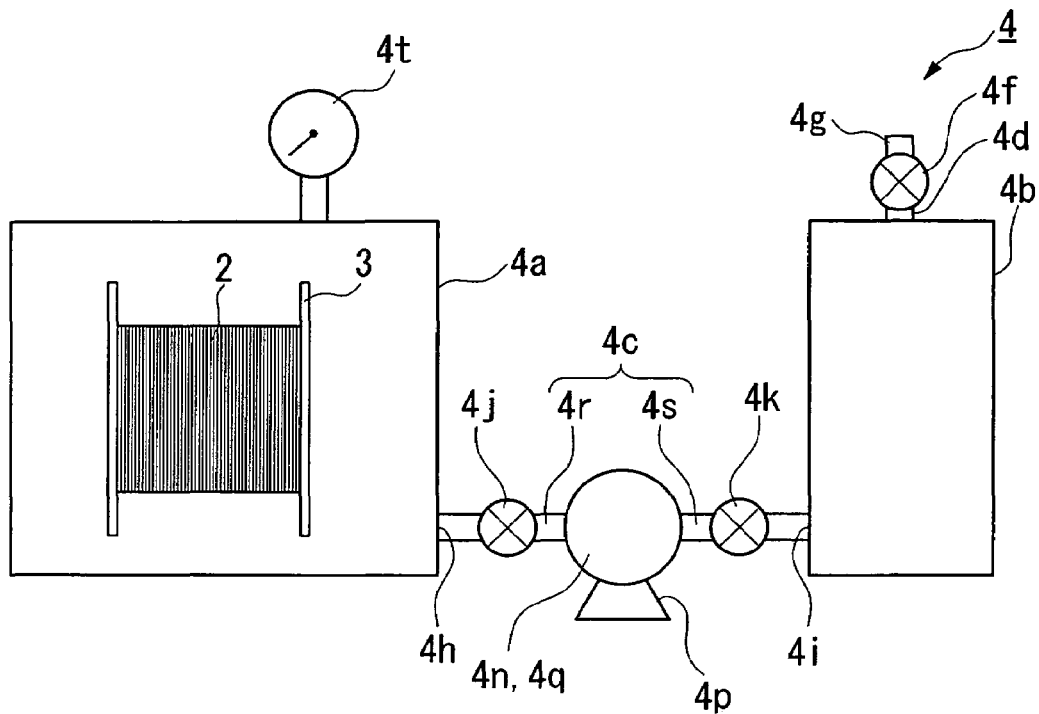
FIG. 3 is a schematic view of an optical fiber treating apparatus according to the present invention.

FIG. 3 is a schematic view of an optical fiber treating apparatus according to the present invention.

This optical fiber treating apparatus 4 has a reactor 4a, a deuterium storage tank 4b, and a pipeline 4c connecting the reactor 4a and the deuterium storage tank 4b.

The reactor 4a is a sealable vessel capable of housing in its interior (first space) an optical fiber 2. It has a pressure resistance and sealability capable of withstanding a vacuum state of about 0.1 kPa and pressurized states ranging from atmospheric pressure to 304 kPa.

The deuterium storage tank 4b is a tank capable of storing deuterium-containing gas in its interior (second space) thereof. Like the reactor 4a, it has a pressure resistance and sealability capable of withstanding a vacuum state of about 0.1 kPa and pressurized states ranging from atmospheric pressure to 304 kPa.

The deuterium storage tank 4b has a gas inlet 4d which is connected to a gas feed line 4g through a gas intake on-off valve 4f in such a way that deuterium-containing gas can be fed from the gas feed line 4g into the tank 4b.

The reactor 4a and the deuterium storage tank 4b are respectively provided with gas entry/discharge openings 4h or 4i. The gas entry/discharge openings 4h and 4i are connected through on-off valves 4j and 4k to the pipeline 4c. The reactor 4a and the deuterium storage tank 4b are connected together by this single pipeline 4c.

The apparatus is arranged so that, using the interior (third space) of the pipeline 4c as the flow channel, the deuterium-containing gas can flow from the reactor 4a to the deuterium storage tank 4b or vice versa.

A changeover valve 4n is provided on the path of the pipeline 4c, and a gas discharge line 4p and a gas supplying element 4q are connected to this changeover valve 4n.

Pressurizing/vacuum dual-use pumps such as a scroll-type vacuum pump or a diaphragm-type dry vacuum pump may be suitably used as the gas supplying element 4q.

Valves which have connectors in at least three directions can be used as the changeover valve 4n in the present invention. That is, it is possible to use a valve which can switch a direction of a flow channel as required, for example, such that one connector in one direction is connected to one of the other two connectors in the other two directions. Illustrative examples include three-way valves and three-way electromagnetic valves.

In the present specification, that portion of the pipeline serving as a path from the changeover valve 4n to the gas entry/discharge opening 4h on the reactor 4a shall be referred to below as the reactor-side line 4r, and that portion of the pipeline serving as a path from the changeover valve 4n to the gas entry/discharge opening 4i on the deuterium storage tank 4b shall be referred to as the deuterium storage tank-side line 4s.

In this embodiment, the changeover valve 4n can change the flow path. That is, it is possible to control a flow from one channel which is selected from the reactor-side line 4r, the deuterium storage tank-side line 4s and the gas discharge line 4p to one of either of the other two channels. The gas supplying element 4q can provide for the delivery of gas from one direction to the other direction along the two connected channels after changeover.

The reactor 4a can be provided with a differential pressure gauge 4t, such that it can measure the pressure within the reactor 4a. In the present invention, it is possible to have a construction, design or the like which can control pressure based on this measured value obtained from the differential pressure gauge 4t. For example, based on the value, the amount of deuterium-containing gas supplied can be adjusted using the gas supplying element 4q to form within the reactor 4a a deuterium-containing gas atmosphere of a predetermined pressure, and/or a reduced-pressure atmosphere having a specific pressure can be formed at the interior of the reactor 4a.

The reactor 4a has a temperature-regulating element such as a heater or a cooling mechanism, as well as a thermometer and a temperature regulator, that can adjust the internal temperature so as to set the interior of the reactor 4a to a constant temperature state of 50° C. or below.

Next, a treatment method in which an optical fiber 2 is exposed to deuterium-containing gas using the optical fiber treating apparatus 4 of the present invention is described.

In a first step, an optical fiber 2 is exposed to a reduced-pressure atmosphere in the following manner. First, an optical fiber 2 that has been wound onto a bobbin 3 is placed at rest in the reactor 4a. The temperature within the reactor 4a is adjusted to 50° C. or less. Next, a changeover valve 4n is switched so as to connect the reactor-side line 4r with the gas discharge line 4p. On the reactor-side line 4r, the on-off valve 4j is opened and air within the reactor 4a is discharged to the gas discharge line 4p by the gas supplying element 4q. These members, element and the like are used to form a reduced-pressure atmosphere within the reactor 4a, i.e., within a first space that holds the optical fiber 2, thus exposing the optical fiber 2 to a reduced-pressure atmosphere.

Next, in a second step subsequent to the above first step, the optical fiber 2 is exposed to a deuterium-containing gas atmosphere in the following manner.

The interior of the deuterium storage tank 4b is filled beforehand to a given pressure with a deuterium-containing gas that contains a specific concentration of deuterium gas.

The on-off valve 4j on the reactor-side line 4r is then closed, following which the changeover valve 4n is switched so that the reactor-side line 4r and the deuterium storage tank-side line 4s are in a connected state.

Next, the on-off valve 4j on the reactor-side line 4r and the on-off valve 4k on the deuterium storage tank-side line 4s are both opened, thereby connecting the reactor 4a with the deuterium storage tank 4b via the pipeline 4c.

The deuterium-containing gas in the deuterium storage tank 4b flows to the reduced-pressure atmosphere reactor 4a through the interior (third space) of the pipeline 4c as the flow channel.

Once the interior of the reactor 4a reaches a specific pressure, the on-off valve 4j on the reactor-side line 4r and the on-off valve 4k on the deuterium storage tank-side line 4s are both closed, sealing the interior of the reactor 4a, and the optical fiber 2 is exposed to the deuterium-containing gas atmosphere within the reactor 4a.

In this way, it is possible that the optical fiber 2 is exposed to deuterium-containing gas, NBOHCs within the glass and deuterium combine and form deuteroxyl groups, and the NBOHCs is eliminated. Next, following the second step, a third step is carried out in which the deuterium-containing gas is recovered as described below. The changeover valve 4n is switched so that the reactor side line 4r and the deuterium storage tank-side line 4s are in a connected state. The on-off valves 4j and 4k are opened, connecting the reactor 4a with the deuterium storage tank 4b via the pipeline 4c, and the gas supplying element 4q is operated, delivering the deuterium-containing gas within the reactor 4a to the deuterium storage tank 4b and thus placing the interior of the reactor 4a in a vacuum state.

The on-off valve 4j on the reactor-side line 4r is closed and atmospheric air is introduced into the reactor 4a, following which the optical fiber 2 is removed from the reactor 4a.

In the above manner, deuterium-containing gas that has been used once, instead of being discharged, is stored in a deuterium storage tank 4b and can be used for deuterium treating for other optical fibers 2.

Figure 4:
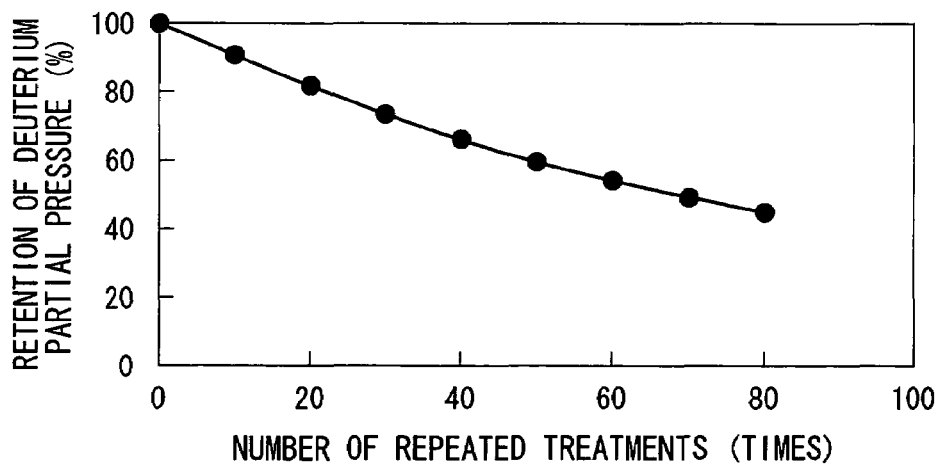
FIG. 4 is a graph showing the relationship between retention of the deuterium gas partial pressure within a deuterium-containing gas that has been used repeatedly to treat optical fiber and the number of treatments carried out with the gas.

FIG. 4 is an example showing the change in deuterium gas partial pressure within a deuterium-containing gas when the deuterium-containing gas is repeatedly used to treat optical fiber 2.

When the optical fiber treating apparatus 4 of the present invention was used, even after 30 repeated deuterium treatments, the retention of deuterium partial pressure was at least 70%, which was a concentration sufficient to carry out deuterium treatment.

Hence, the deuterium-containing gas can be repeatedly used, providing a substantial reduction in the running costs associated with the deuterium gas and making it possible for deuterium treatment to be inexpensively carried out. In other words, it is possible to repeatedly use the deuterium-containing gas and to repeatedly carry out the first, second and third steps of the above-described method.

EXAMPLES

Example 1

Using the optical fiber treatment apparatus 1 shown in FIG. 1, NBOHC annihilating treatment was carried out by exposing an optical fiber 2 wound onto a bobbin 3 to deuterium-containing gas. A description of the optical fiber 2 treating method is omitted here because the method is the same as the aforementioned embodiment for carrying out the present invention described above. The optical fiber 2 used was one which had an optical loss at 1.38 μm of 0.27 dB/km and a cladding diameter of 125 μm.

In the first step, the inside of a reactor 1a housing the optical fiber 2 was evacuated to 0.1 kPa.

Next, in the second step, deuterium-containing gas wherein a deuterium gas partial pressure of 0.51 kPa was fed into the reactor 1a. This deuterium-containing gas was fed until a pressure within the reactor 1a become 95 kPa, and then the reactor 1a was sealed. The optical fiber 2 was exposed in this state to the deuterium-containing gas for 12 hours. Here, the interior of the reactor 1a during exposure of the optical fiber to deuterium-containing gas was set to a temperature of 25° C.

Of the optical fiber 2 wound onto the bobbin 3, the amount of light absorption at the NBOHC absorption wavelength of 0.63 μm was measured at given time intervals on that portion wound directly onto the core of the bobbin 3 (the optical fiber 2 located on the bottommost layer) and on that portion located surface-most (optical fiber 2 located at the topmost layer), and the amounts of NBOHCs remaining on the respective portions of the optical fiber 2 were determined from these light absorption levels.

Next, the change over time in the amount of NBOHCs remaining on the optical fiber 2 (change in amount with respect to length of exposure) was determined. Based on this change in the amount of NBOHCs over time, the deuterium-containing gas exposure time required to completely annihilate the NBOHCs was estimated, and this value was treated as the annihilation time.

The difference between the NBOHC annihilation time for the optical fiber 2 located on the bottommost layer and the NBOHC annihilation time for the optical fiber 2 located on the topmost layer (difference of NBOHC annihilation time on optical fiber located on bottommost layer with respect to NBOHC annihilation time for optical fiber 2 located on topmost layer) was determined. This was the NBOHC annihilation delay time.

In Example 1, the optical fiber exposed to deuterium-containing gas had a NBOHC annihilation delay time of 0 hours, indicating that the NBOHC annihilation time for the optical fiber 2 located on the bottommost layer and the NBOHC annihilation time for the optical fiber 2 located on the topmost layer were the same.

Hence, NBOHCs and deuterium reacted at the same reaction rate in the optical fiber 2 located on the bottommost layer as in the optical fiber located on the topmost layer, the NBOHCs can be eliminated. Moreover, using low-concentration deuterium-containing gas having a deuterium gas partial pressure of 0.51 kPa, it was possible to eliminate NBOHCs over the entire length of the optical fiber in a short exposure time.

Comparative Example 1

Comparative Example 1 differs from Example 1 in that the first step in which the interior of the reactor 1a that holds the optical fiber 2 is placed under a reduced-pressure atmosphere was not carried out. Instead, the deuterium-containing gas was fed to a reactor 1a containing an atmospheric-pressure air environment, thereby creating within the reactor 1a a deuterium-containing gas atmosphere having a deuterium partial pressure of 0.51 kPa. The other conditions were the same as in Example 1 and are thus omitted here.

The optical fiber 2 was exposed to a deuterium-containing gas atmosphere for 12 hours, yet NBOHCs in the bottommost layer of optical fiber 2 were not annihilated and remained in the glass.

It appears likely that because the deuterium-containing gas was fed without reducing the pressure within the reactor 1a holding the optical fiber 2, the diffusion rate of the deuterium-containing gas could not be increased, making it difficult for the deuterium-containing gas to reach the vicinity of the bobbin core. As a result, the optical fiber located in the bottommost layer did not readily come into contact with the deuterium-containing gas, making it difficult for the reaction between the NBOHCs and the deuterium to proceed.

In this way, treatment carried out over a short exposure period of 12 hours using a low-concentration deuterium-containing gas having a deuterium gas partial pressure of 0.51 kPa leaves behind NBOHCs in the optical fiber 2 present on the bottommost layer. Hence, NBOHCs cannot be eliminated throughout the optical fiber 2.

Example 2

Example 2 differs from Example 1 in the following ways. In the first step, the pressure within the reactor 1a was lowered to 0.01, 10, 20, 50, 70, 90 or 95 kPa; in the second step, the optical fiber 2 was exposed to deuterium-containing gas at a deuterium gas concentration of 1.0% and a deuterium partial pressure of 0.51 or 1.0 kPa. The other conditions were the same as in Example 1 and are omitted here.

As in Example 1, the NBOHC annihilation delay time was measured, and the relationship (FIG. 2) between this NBOHC annihilation delay time and the pressure of the reduced-pressure atmosphere in the first step was determined. As shown in FIG. 2, by setting the pressure of the reduced-pressure atmosphere in the first step to at least 0.01 kPa but not more than 76 kPa, the NBOHC annihilation delay time was able to be reduced to 5 hours or less. In particular, by setting the pressure of the reduced-pressure atmosphere to at least 0.01 kPa but not more than 51 kPa, it was possible to reduce the NBOHC annihilation relay time to not more than 0 hours.

Example 3

The optical fiber 2 in the second step was exposed to deuterium-containing gas at various deuterium-containing gas pressures within the reactor 1a, and the relationship between the NBOHC annihilation delay time and the deuterium-containing gas pressure within the reactor 1a in this second step was determined.

Example 3 differs from Example 1 in the following ways. In the second step, deuterium-containing gas having a deuterium gas concentration of at least 0.5% but not more than 5.0% was fed to the reactor 1a in such a way as to have the partial pressure of deuterium within the reactor 1a be 0.51 kPa and to have the pressure of the deuterium-containing gas within the reactor 1a be at least 10.1 kPa but not more than 304 kPa. The other conditions were the same as in Example 1 and are omitted here.

The NBOHC annihilation delay time was measured, as a result of which, in the second step, by setting the deuterium-containing gas pressure within the reactor 1a to at least 10.1 kPa but not more than 304 kPa, as in Example 1, the NBOHC annihilation delay time was 0 hours. It was thus possible to eliminate NBOHCs throughout the optical fiber in a short exposure time.

To hold down the reactor 1a manufacturing costs, it is preferable in step 2 for the pressure of the deuterium-containing gas within the reactor 1a to be lower than 203 kPa.

Example 4

This example differs from Example 2 in that the temperature within the reactor 1a was set to at least 5° C. but not more than 50° C. The other conditions were the same as in Example 1 and are omitted here.

Even when the temperature within the reactor 1a was set to at least 5° C. but not more than 50° C., results similar to those in Example 2 were obtained. However, when the temperature in the reactor 1a is higher than 50° C., the resin coating layer on the surface of the optical fiber 2 may undergo deterioration by the heat, in addition to which temperature regulation of the reactor 1a may become difficult, compromising the efficiency of the work and the like.

Example 5

Using the optical fiber treatment apparatus 4 shown in FIG. 3, fiber glass treatment was carried out in which the same deuterium gas was repeatedly recovered in order to expose optical fibers 2, which were not treated, to the deuterium-containing gas, and then the relationship between the partial pressure of the deuterium gas and the number of treatments carried out with the gas was examined.

The sequence of the operations is omitted here because it was the same as in the aforementioned embodiment for carrying out the present invention described above. The optical fiber used in Example 5 had an optical loss at 1.38 µm of 0.27 dB/km and a cladding diameter of 125 µm.

In the first step, the interior of the reactor 1a holding the optical fiber 2 was lowered to a pressure of 1.0 kPa.

Next, in the second step, a deuterium-containing gas having a deuterium partial pressure of 2.0 kPa was fed to the interior of the reactor 1a. This deuterium-containing gas was fed until the pressure within the reactor 1a reached 98 kPa, following which the reactor 1a was sealed. The optical fiber 2 was exposed to the deuterium-containing gas in this state for 12 hours. The temperature within the reactor 1a during exposure of the optical fiber 2 to the deuterium-containing gas was set at 25° C.

Next, in a third step, the deuterium-containing gas in the reactor 1a was delivered by pump to the deuterium storage tank and the pressure within the reactor 1a was reduced to 1.0 kPa, and then the pressure was returned to atmosphere pressure.

With each treatment in the above second step, the partial pressure of deuterium in the deuterium-containing gas supplied to the reactor 4a was measured. The deuterium-containing gas was repeatedly used, and the relationship between retention of the deuterium partial pressure within the deuterium-containing gas following treatment of the optical fiber 2 versus the number of treatments (FIG. 4) was determined. Here, "retention of deuterium partial pressure" refers to the ratio of the partial pressure of deuterium gas wherein the gas is repeatedly used a specific number of times to the partial pressure of deuterium gas wherein the gas is used only the one time, expressed as a percentage.

Even when deuterium treatment was repeatedly carried out 30 times, retention of the deuterium partial pressure was more than 70%, which was a concentration fully capable of annihilating NBOHCs in the optical fiber 2. In fact, NBOHCs were eliminated over the entire length of all the optical fibers on which deuterium treatment was carried out in this example.

INDUSTRIAL APPLICABILITY

The present invention can provide for non-bridging oxygen hole centers in an optical fiber to be annihilated in a short exposure time using a low-concentration deuterium-containing gas, thus making it possible to obtain low-loss optical fibers which can be used as, for example, optical fibers having a 1.3 µm optical communication wavelength band or the like. The present invention also provides an optical fiber treatment method which is capable of uniformly treating with deuterium-containing gas in a short time the entire length of an optical fiber that has been wound onto a bobbin, and an optical fiber treatment apparatus which can re-use deuterium-containing gas and can carry out treatment with deuterium-containing gas at a low cost.

The invention claimed is:

1. A method of treating optical fiber, wherein a deuterium-containing gas can be repeatedly used for treating optical fiber comprising:
    a first step of creating a reduced-pressure atmosphere in a space which holds an optical fiber, a second step of introducing to the space a deuterium-containing gas from a deuterium storage tank so as to expose the optical fiber to the gas, and
    a third step of retrieving the deuterium-containing gas within the space to the deuterium storage tank.

2. The optical fiber treatment method of claim 1, wherein the reduced-pressure atmosphere within the space in the first step is set to at least 0.01 kPa but not more than 75 kPa.

3. The optical fiber treatment method of claim 1, wherein the reduced-pressure atmosphere within the space in the first step is set to at least 0.01 kPa but not more than 50 kPa.

4. The optical fiber treatment method of claim 1, wherein the optical fiber in the second step is exposed to the deuterium-containing gas at a deuterium gas partial pressure of at least 0.1 kPa but not more than 5 kPa.

5. The optical fiber treatment method of claim 1, wherein the optical fiber in the second step is exposed to the deuterium-containing gas at a pressure within said space of at least 10.1 kPa but not more than 203 kPa.

6. The optical fiber treatment method of claim 1, wherein the optical fiber in the second step is exposed to the deuterium-containing gas for a period of not more than one day.

7. The optical fiber treatment method of claim 1, wherein the optical fiber in the second step is exposed to the deuterium-containing gas at a temperature of not more than 50° C.

8. A method of treating optical fiber, wherein a deuterium-containing gas can be repeatedly used for treating optical fiber comprising:
    a first step of creating a reduced-pressure atmosphere in a space which holds an optical fiber,
    a second step of introducing to the space a deuterium-containing gas from a deuterium storage tank so as to expose the optical fiber to the gas,
    a third step of retrieving the deuterium-containing gas within the space to the deuterium storage tank, and
    repeating the first, second, and third steps.

* * * * *